United States Patent Office 2,969,342
Patented Jan. 24, 1961

2,969,342

VINYL RESIN COMPOSITIONS STABILIZED WITH ACYL BORATES

Otto Konig, Forest Hills, and Eliot G. Gordon, New York, N.Y., and Daniel F. Herman, Orange, N.J., assignors to National Lead Company, New York, N.Y., a corporation of New Jersey No Drawing. Filed May 6, 1958, Ser. No. 733,268

6 Claims. (Cl. 260—45.85)

This invention relates to vinyl resin compositions and more particularly to such compositions stabilized as to their physical properties against the action of light and heat.

It is well-known that vinyl resin compositions are sensitive to the action of light and heat and that the acidic degradation products produced by such action react to effect deterioration of the resin composition. This deterioration, primarily evidenced by color changes in the resin composition, which are in themselves undesirable, also seriously affects other physical characteristics of the resins such as flexibility and tensile strength. Since the resin compositions are necessarily exposed to heat during compounding and processing and to light during aging, it is desirable to incorporate agents which tend to stabilize the physical properties of the resin compositions.

Various agents have heretofore been employed to stabilize vinyl resin compositions against these effects. Among those that have been employed, each with some degree of success, are various organic and inorganic compounds of lead, organotin compounds, barium salts, etc. Although each of these classes of stabilizers contributed a useful degree of stability, each of them also possessed certain disadvantages. Thus, the lead compounds, while effective stabilizers, are not usable where a clear resin composition is desired. Some of the organotin compounds are capable of producing clear resin compositions, but are less effective as stabilizers. The barium salts contribute little stabilizing effect of their own, although they do enhance the effectiveness of other stabilizing agents in some formulations.

Cadmium salts of naphthenic and fatty acids have heretofore been employed as stabilizers for vinyl resin compositions. The cadmium salt stabilizers are particularly valuable because they impart clarity to the resin compositions as well as stabilization properties. Their employment has therefore been indicated where clarity is desired in the finished product. Such a requirement excludes the use of stabilizers which tend to produce cloudy or opaque products.

While the cadmium stabilizers as employed heretofore impart excellent clarity to the vinyl resin composition, they are somewhat deficient in stabilization properties. Because of their relatively poor stabilizing properties, when used above they did not initially enjoy the wide commercial use that might otherwise have been expected. This difficulty has been overcome to a large extent by the use of basic salts of cadmium, as more fully described and claimed in copending application Ser. No. 613,833, filed October 4, 1956 and assigned to the assignee hereof. Nevertheless, even the basic cadmium salts did not furnish a complete answer to the stabilization problem because the basic cadmium salts are not soluble in organic solvents which are used to promote maximum dispersion of the stabilizer in polyvinyl chlorides.

The principal object of this invention, therefore, is to provide improved vinyl halide resin compositions stabilized as to the effects of light and heat. Other objects and advantages will become apparent from the following more complete description and claims.

Broadly, this invention contemplates a vinyl halide resin composition containing, as stabilizer therefore, an acylate of boric acid and an organic carboxylic acid. In particular, this invention relates to vinyl halide resin compositions containing about 0.10 to 15% by weight based on the resin of a boron acylate having about 2 to 12 carbon atoms in the acylate group.

The boron compounds suitable for use as stabilizing agents according to this invention may be represented by the formula:

Wherein RCOO represents the acylate group of an organic carboxylic acid containing from 2 to 12 carbon atoms when said acid is aliphatic and from 7 to about 15 carbon atoms when said acid is aromatic, Z represents a group selected from the group consisting of alkoxy radicals, hydroxyl radicals and (=O)½ radicals, $x$ is from 1 to 3 and $y$ is from 0 to 2, the sum of $x$ and $y$ being 3. The group characterized as (=O)½ is intended to indicate that the boron atom may be linked to a single acylate group and twice to a doubly-bonded oxygen atom, RCOOB=O, or for example, to two acylate groups and to a single oxygen atom which in turn is shared with another boron atom as in the biborates and polyborates, e.g.,

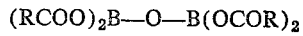

The boron compounds useful according to this invention, therefore, include boron triacylates such as triacetyl borate, tripropionyl borate, tri (isopropionyl) borate, the tributylryl borates, etc., as well as the boron triacylates in which the acylate group is that of a moderately long chain fatty acid, for example tricaproyl borate, tricaprylyl borate, tri-2-ethylhexoyl borate, as well as mixed boron triacylates wherein the acylate groups differ.

Also included among the boron compounds useful herein are alkoxyboron acylates wherein Z, in the above formula, is an alkoxy group. A few random examples of such compounds are dimethoxy boron myristate, ethoxyboron dilaurate, diisopropoxyboron caprate, n-butoxyboron dicaprylate, 2-ethylhexoxyboron dibutyrate, dinonoxyboron propionate, dodecoxyboron diacetate, etc.

Where Z in the above formula (or one of the Z groups if there are more than one) is OH, the compounds are acylates of orthoboric acid, among which may be mentioned such compounds as diacetyl orthoborate, (CH₃COO)₂BOH, monopropionyl orthoborate, $$C_2H_5COOB(OH)_2$$

dibutyryl orthoborate, (C₃H₇COO)₂BOH, capryl orthoborate, C₉H₁₉COOB(OH)₂, dilauroyl orthoborate, $$(C_{11}H_{23}COO)_2BOH$$

etc. Also included are orthoboric acid derivatives wherin one of the Z groups is hydroxyl and one is alkoxy, for example such compounds as acetyl 2-ethylhexoxy orthoborate, (CH₃COO)(C₈H₁₇O)BOH.

When Z is the group above designated as (=O)½, the compounds are either derivatives of metaboric acid, for example acetyl metaborate, CH₃COOB=O, lauroyl metaborate, C₁₁H₂₃COOB=O, and the like, or polyborates, that is, compounds which, besides being acylates of orthoboric acid with organic acids, are also acylates of orthoboric acid "with itself," in that they may be considered as derived by condensation with elimination of water between two B—O—H linkages of different molecules. Such compounds are all polymeric to some extent, and include biborates which may be formed from diacylate derivatives of orthoboric acid, e.g., tetraacetyl biborate, $(CH_3COO)_2B-O-B(OCOCH_3)_2$, and the analogous compounds containing carbon chains up to about 24 carbons, and polyborates, which may be formed from monoacylate derivatives of orthoboric acid, for example,

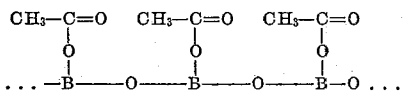

and again, the analogous compounds containing up to about 24 carbon atoms per acylate group.

In addition, the biborates may react with a dibasic acid in two ways. They may react to form a tetraacyl borate as follows:

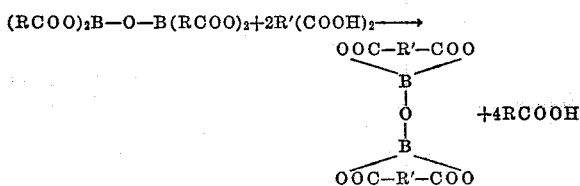

or they may react to form a poly(acylborate) as follows:

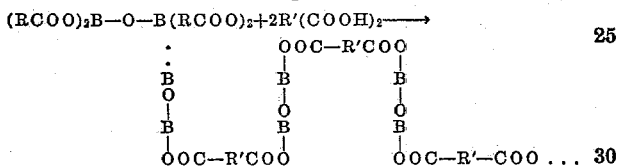

The same products may, of course be formed from the reaction of boric acid with the acylchloride of a dibasic acid, or of boric anhydride with the anhydride of a dibasic acid, and analogous methods.

Although the above selection of compounds operable according to this invention has been chosen from saturated aliphatic compounds, it is to be understood that the acylate group may be unsaturated, and may also be derived from a dibasic acid as well as from a monobasic acid, and may be aromatic as well as aliphatic. Examples of unsaturated aliphatic acids whose acylates with orthoboric acid are operable according to this invention include acrylic acid, crotonic acid, isocrotonic acid, methacrylic acid, vinylacetic acid, oleic acid, linoleic acid, erucic acid, undecylenic acid, and the like. Examples of dibasic acids, whose derivatives are operable in the present invention, include maleic acid, fumaric acid, pimelic acid, oxalic acid, malonic acid, succinic acid, glutaric acid, adipic acid, suberic acid, azelaic acid, sebacic acid, phthalic acid, isophthalic acid, terephthalic acid, and the like.

Examples of aromatic acids whose derivatives are operable according to this invention include benzoic and alkyl-substituted benzoic acids, containing up to about 12 carbon atoms in the alkyl group and naphthoic and alkyl-substituted naphthoic acids containing up to about 12 carbon atoms in the alkyl group.

The boron compounds useful in this invention may be prepared in a variety of ways. One of the most convenient of such ways is by the direct action of an acyl chloride on orthoboric acid in the ratio approximately of the stoichiometrically equivalent quantities corresponding to the borate desired, at moderately elevated temperatures, (e.g., under reflux where the acid is sufficiently low-boiling to be amenable to refluxing, or where a solvent is employed). No solvent or other reaction medium is ordinarily required, at least in the case of the lower-boiling acids, but an inert solvent such as the aromatic hydrocarbons, i.e. benzene and its homologs or the dialkyl ethers such as ethyl ether, isopropyl ether, and the like and petroleum ether may be employed if desired, and frequently facilitates the management of the reaction. Where the acylchloride employed is very volatile, as in the case of formyl or acetyl chloride, it is frequently advisable to employ a moderate excess of it (say 10%) over the stoichiometric amount. HCl is formed in the reaction, and most of it is volatilized as formed. Some, however, remains in solution, and this should be removed at the end of the reaction by flashing off under vacuum.

Another convenient method, for preparing the higher acylates is by the interaction of boron acetate with the appropriate acid, or, in case mixed acylates are desired, an appropriate acid mixture. Acetic acid is liberated, being replaced by the higher-boiling acid or acids, and is removed by distillation under reduced pressure.

A third method that is particularly adapted to the production of alkoxy boron acylates is the interaction of a boron ester, preferably that of a low-boiling alcohol, with the appropriate acid or acid anhydride. The alcohol is liberated, either as such or in the form of an ester with the acid used. The alcohol or ester is removed by distillation. The residue is then vacuum-distilled, and the constant-boiling cut collected as the product.

In addition, the boron acylates according to this invention may be prepared by heating together equivalent units of boric anhydride and an acid anhydride.

The stabilizers may be introduced into the composition at any desired stage of the manufacture, but it is preferable to add them before or during the milling or mixing of the ingredients. It has been found that the boron compounds according to this invention disperse readily in the mixture of vinyl resin and other compounding agents so that a uniform dispersion is obtained. After mixing, the ingredients are fluxed and homogenized on a mill at conventional temperatures.

By the term "vinyl halide resin" we mean to include the various vinyl resin compounds and compositions known to the art such as, polyvinyl chloride; vinyl resins produced by conjointly polymerizing a vinyl halide with vinyl acetate or other vinyl ester; vinyl resins produced by conjoint polymerization with an acrylic compound as for instance, ethyl methacrylate, or methyl methacrylate; and co-polymers of a vinyl halide with other vinyl halide resin co-polymers as vinylidene halide.

As an illustration of the compositions according to this invention the following examples are shown:

*Example 1*

A stabilizer was prepared by heating together the following ingredients at 200° F.

| | Parts |
|---|---|
| Barium 2-ethylhexoate | 19 |
| Cadmium 2-ethylhexoate | 12 |
| Phenol | 4 |
| 2-ethylhexanol | 65 |

This composition was reserved as a control. A stabilizer composition according to this invention was prepared by heating together, in the same way the following ingredients:

| | Parts |
|---|---|
| Barium 2-ethylhexoate | 19 |
| Cadmium 2-ethylhexoate | 12 |
| Phenol | 4 |
| Tetraacetyl biborate | 4 |
| 2-ethylhexanol | 61 |

Two batches of vinyl resin composition were prepared, one using the control stabilizer, the other using the stabilizer containing the tetraacetyl biborate, according to the following formulation:

| | Parts |
|---|---|
| Polyvinyl chloride polymer | 100 |
| Di-2-ethylhexyl phthalate | 50 |
| Stabilizer | 3 |

All parts, unless otherwise specified, are parts by weight. The resin composition was compounded on a heated 3-roll mill until well homogenized.

Both batches of the stabilized resin composition were then calendered to clear, water white sheets of 20 mil thickness, samples of which were heat tested at various temperatures. After 50 minutes at 375° F., the composition stabilized with the borate-free stabilizer had turned to a reddish brown color whereas that stabilized with the stabilizer containing tetraacetyl biborate was merely a dark yellow. Similar tests were run at higher temperatures on 40 mil calendered sheets. After 25 minutes at 400° F., a 40 mil sheet of the composition control was reddish brown, whereas the tetraacetyl biborate containing composition was a dark yellow.

*Example II*

Boric acid, 0.99 mole, and 3 moles of 2-ethylhexoyl-chloride were mixed together and allowed to stand overnight protected from atmospheric moisture. The next day, the mixture was refluxed for 4 hours at 200° C. Hydrochloric acid was developed copiously and when the development of it slackened, the residual amount was removed by connecting the reaction vessel with an aspirator pump. The product, a dark viscous oil, was kept in a vacuum desiccator containing calcium chloride and caustic potash pellets, until the oil was free from chlorides. A good yield of tri (2-ethylhexoyl) borate was obtained.

A pair of stabilizers was prepared as described in Example I, except that in place of the tetraacetyl biborate there were used 4 parts of tri-(2-ethylhexoyl) borate.

Two batches of the same vinyl resin composition described in Example I were again prepared, using the same formulation, i.e.,

| | Parts |
|---|---|
| Polyvinyl chloride polymer | 100 |
| Di-2-ethylhexyl phthalate | 50 |
| Stabilizer | 3 | and the resulting resin compositions were again calendered to 20 mil films. The films were clear and colorless. Upon heat testing, the control had turned reddish brown after 50 minutes at 375° F. whereas the film stabilized with the tri-(2-ethylhexoyl) borate was merely a light orange.

A pair of stabilizers was again prepared as described in Example I, except that in place of the tetraacetyl biborate there were used 8 parts of the tri-(2-ethylhexoyl) borate. The earlier procedure of this Example II was again repeated. Upon heat testing, the tri-(2-ethylhexoyl) borate was dark yellow after 50 minutes at 375° F., whereas the control had turned reddish brown.

A pair of stablizers was again prepared as described in Example I, except that in place of the tetraacetyl biborate there were used 10 parts of the tri-(2-ethylhexoyl) borate. The previous procedure of preparing a vinyl resin composition as described earlier in this Example II was again repeated. Upon heat testing, the tri-(2-ethylhexoyl) borate was yellow after 50 minutes at 375° F., whereas the control had turned orange.

*Example III*

To 0.5 mole of tetraacetyl biborate was added 2.0 moles of 2-ethylhexoic acid and 550 ml. of xylene. The mixture was heated to reflux and kept there for one hour. Then the xylene and acetic acid formed in the reaction was removed by distillation. The residue, being the product, tetra-(2-ethylhexoyl) biborate, was kept in a vacuum desiccator over calcium chloride and caustic potash pellets until free from residual acetic acid.

The procedure of Examples I and II was again repeated, using 8 parts of tetra-(2-ethylhexoyl) biborate in place of the borates used in Examples I and II. Upon heat testing, the tetra-(2-ethylhexoyl) biborate containing composition was dark yellow after 55 minutes at 375° F., whereas the control had turned reddish brown after 50 minutes at 375° F.

The above procedure was again repeated, except that the stabilized resin compositions were calendered to clear, water white sheets of 40 mil thickness. Upon heat testing, the tetra-(2-ethylhexoyl) biborate containing composition was dark yellow after 25 minutes at 400° F., whereas the control had turned black after 25 minutes at 400° F.

*Example IV*

Boric acid, 0.5 mole, and 1.5 moles of benzoyl chloride was heated and refluxed until no more hydrogen chloride gas was given off. The reaction was maintained at 240° C. to 250° C. for 70 minutes. The reaction mixture was a homogeneous melt. The reaction was allowed to cool, and a good yield of a yellow crystalline solid was obtained, which was the product, tribenzoyl borate.

The procedure of Example I and II was again repeated, using 8 parts of the tribenzoyl borate in place of the borates used in Examples I and II. Upon heat testing, the tribenzoyl borate containing composition was dark yellow after 50 minutes at 375° F., whereas the control had turned reddish brown after 50 minutes at 375° F.

*Example V*

To 0.5 mole of boron acetate was added 1.5 moles of alpha napthoic acid and 500 ml. of xylene. The mixture was refluxed at 137° C. for one hour. The xylene, and the acetic acid of the reaction were removed, and the residue, being the product trinaphthoyl borate, was kept in a vacuum desiccator over calcium chloride and caustic potash pellets until free from residual acetic acid.

The procedure of Examples I and II was again repeated, using 10 parts of the trinaphthoyl borate in place of the borates used in Examples I and II. Upon heat testing, the trinaphthoyl borate containing composition was yellow after 50 minutes at 375° F., whereas the control had turned reddish brown after 50 minutes at 375° F.

*Example VI*

To 0.03 mole of boric acid anhydride was added 0.1 mole of salicylic anhydride. To the mixture was added 500 ml. of xylene and the mixture was refluxed at 137° C. for two hours, and the xylene was then filtered off. The resultant product was trisalicylyl borate.

The procedure of Examples I and II was again repeated, using 6 parts of the trisalicylyl borate in place of the borates used in Examples I and II. Upon heat testing, the trisalicylyl borate containing composition was a dark yellow after 50 minutes at 375° F., whereas the control had turned reddish brown after 50 minutes at 375° F.

The foregoing examples illustrate specific embodiments of the instant invention. It will be apparent that vinyl halide resin compositions employing the boron compounds described above have been substantially improved with respect to their stabilization against the effects of heat and light. A variety of plasticizers, coloring and modifying agents may also be employed in these compositions as will be understood by those skilled in the art.

While this invention has been described and illustrated by the examples shown, it is not intended to be strictly limited thereto and other modifications may be employed within the limits of the following claims.

We claim:

1. A vinyl halide resin composition containing, as stabilizer therefor, about 0.10 to 15% by weight, based on said resin, of a boron acylate having from 2 to about 12 carbon atoms in the acylate group.

2. A vinyl halide resin containing, as stabilizer therefor, an organic compound of boron representable by the formula $$(RCOO)_x BZ_y$$

wherein RCOO represents the acylate group of an organic carboxylic acid containing from 2 to about 12 carbon atoms when said acid is aliphatic and from 7 to about 15 carbon atoms when said acid is aromatic, Z represents a radical selected from the group consisting of alkoxy radicals, hydroxyl radicals and $(=O)\frac{1}{2}$ radicals, $x$ is from one to three and $y$ is from 0 to 2, the sum of $x$ and $y$ being 3.

3. A vinyl halide resin composition according to claim 1, wherein the boron compound is tri(2-ethylhexoyl) borate.

4. A vinyl halide resin composition according to claim 1, wherein the boron compound is tribenzoyl borate.

5. A vinyl halide resin composition according to claim 2, wherein said organic compound of boron is tetraacetyl biborate.

6. A vinyl halide resin composition according to claim 2, wherein said organic compound of boron is tetra(2-ethylhexoyl) biborate.

References Cited in the file of this patent
UNITED STATES PATENTS

| | | |
|---|---|---|
| 1,987,559 | Hintermaier | Jan. 8, 1935 |
| 2,554,142 | Grummitt | May 22, 1951 |
| 2,592,311 | Meyers et al. | Apr. 8, 1952 |
| 2,782,233 | Muetterties | Feb. 19, 1957 |